(12) United States Patent
Delpuch

(10) Patent No.: US 9,197,313 B2
(45) Date of Patent: Nov. 24, 2015

(54) REMOTE CONTROL WITH NEAR FIELD COMMUNICATIONS CAPABILITY

(71) Applicant: NAGRAVISION S.A., Cheseaux-sur-Lausanne (CH)

(72) Inventor: Alain Delpuch, Paris (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/204,377

(22) Filed: Mar. 11, 2014

(65) Prior Publication Data

US 2014/0259061 A1 Sep. 11, 2014

Related U.S. Application Data

(60) Provisional application No. 61/775,737, filed on Mar. 11, 2013.

(51) Int. Cl.
*H04N 5/232* (2006.01)
*H04B 7/15* (2006.01)
(Continued)

(52) U.S. Cl.
CPC .. *H04B 7/15* (2013.01); *G06F 9/54* (2013.01); *G06Q 20/3278* (2013.01); *G06Q 20/385* (2013.01); *G06Q 20/425* (2013.01); *G06Q 30/0637* (2013.01); *H04B 5/0031* (2013.01); *H04L 41/50* (2013.01); *H04L 47/70* (2013.01); *H04L 69/08* (2013.01); *H04N 5/4403* (2013.01); *H04N 21/2223* (2013.01); *H04N 21/2543* (2013.01); *H04N 21/4126* (2013.01); *H04N 21/4185* (2013.01); *H04N 21/41407* (2013.01); *H04N 21/4221* (2013.01); *H04N 21/4222* (2013.01); *H04N 21/42221* (2013.01); *H04N 21/42222* (2013.01); *H04N 21/4367* (2013.01); *H04N 21/43637* (2013.01); *H04N 21/4627* (2013.01); *H04N 21/4784* (2013.01); *H04N 21/47815* (2013.01); *H04N 21/485* (2013.01); *H04N 21/6334* (2013.01); *H04N 21/8355* (2013.01); *H04W 4/008* (2013.01);
(Continued)

(58) Field of Classification Search
CPC ............... H04N 2005/4442; H04N 2005/4407
USPC .......................................... 725/100; 348/734
See application file for complete search history.

(56) References Cited

U.S. PATENT DOCUMENTS 7,147,157 B2 * 12/2006 Proennecke ................... 235/451
8,565,676 B2 * 10/2013 Gormley et al. .............. 455/41.1
(Continued)

FOREIGN PATENT DOCUMENTS

WO WO 2010/071947 7/2010

OTHER PUBLICATIONS

European Search Report issued in European Application No. 14158748 dated Mar. 5, 2015.

*Primary Examiner* — Nathan Flynn
*Assistant Examiner* — Caroline Somera
(74) *Attorney, Agent, or Firm* — DLA Piper LLP US

(57) ABSTRACT

A remote control for controlling a receiver associated with the remote control, such as a television. The remote control comprises a communication mechanism for communicating with the receiver, an active NFC reader for communicating with an active or passive NFC device, and a mechanism for transmitting the information received from the NFC device to the receiver. The remote control allows the use of a near field communication (NFC) portable device (e.g., card or smartphone) for transactions using a receiver.

15 Claims, 1 Drawing Sheet

(51) Int. Cl.
| | |
|---|---|
| *H04W 4/00* | (2009.01) |
| *H04W 76/02* | (2009.01) |
| *H04B 5/00* | (2006.01) |
| *G06Q 20/32* | (2012.01) |
| *G06Q 30/06* | (2012.01) |
| *H04L 12/911* | (2013.01) |
| *H04L 12/24* | (2006.01) |
| *H04N 21/2543* | (2011.01) |
| *H04N 21/422* | (2011.01) |
| *H04N 21/478* | (2011.01) |
| *G06F 9/54* | (2006.01) |
| *G06Q 20/38* | (2012.01) |
| *G06Q 20/42* | (2012.01) |
| *H04N 5/44* | (2011.01) |
| *H04N 21/222* | (2011.01) |
| *H04N 21/41* | (2011.01) |
| *H04N 21/414* | (2011.01) |
| *H04N 21/4185* | (2011.01) |
| *H04N 21/4363* | (2011.01) |
| *H04N 21/4367* | (2011.01) |
| *H04N 21/4627* | (2011.01) |
| *H04N 21/4784* | (2011.01) |
| *H04N 21/485* | (2011.01) |
| *H04N 21/6334* | (2011.01) |
| *H04N 21/8355* | (2011.01) |
| *H04W 80/00* | (2009.01) |
| *H04W 88/16* | (2009.01) |
| *H04L 29/06* | (2006.01) |

(52) U.S. Cl.
CPC ............. *H04W 76/02* (2013.01); *H04W 80/00* (2013.01); *H04W 88/16* (2013.01); *H04N 2005/4414* (2013.01); *H04N 2005/4426* (2013.01); *H04N 2005/4428* (2013.01)

(56) References Cited

U.S. PATENT DOCUMENTS

| | | | |
|---|---|---|---|
| 8,682,248 B2 * | 3/2014 | Jeon et al. | 455/41.2 |
| 2011/0119453 A1 | 5/2011 | Xu et al. | |
| 2011/0264922 A1 | 10/2011 | Beaumont et al. | |
| 2013/0005250 A1 * | 1/2013 | Kim et al. | 455/41.1 |
| 2013/0044051 A1 | 2/2013 | Jeong | |
| 2014/0087655 A1 * | 3/2014 | Hall et al. | 455/41.1 |
| 2014/0101782 A1 | 4/2014 | Beaumont et al. | |

* cited by examiner

REMOTE CONTROL WITH NEAR FIELD COMMUNICATIONS CAPABILITY

CROSS-REFERENCE TO RELATED APPLICATIONS

This application claims the benefit of U.S. Provisional Application No. 61/775,737, filed Mar. 11, 2013, which is incorporated by reference in its entirety.

BACKGROUND

Near Field Communication Technology, known by the acronym "NFC", is a wireless, high frequency communication technology, having a range of a few centimeters, for the exchange of information between multiple devices. This technology is derived from a combination of a smart card interface and a contactless reader in a single device.

An NFC device is able to communicate with other NFC devices as well as devices operating in accordance with the ISO 14443 standard (contactless smart cards).

NFC standards cover the NFC communication protocols and data exchange formats and are based on existing standards for radio frequency identification (RFID) such as ISO/IEC 14443, FeliCa and ISO/IEC 18092. They include standards defined by the "NFC Forum", which was founded in 2004 by Nokia, Philips and Sony and includes more than 180 members.

NFC is an extension of RFID technology, allowing two-way communication between two devices, while previous systems, such as contactless smart cards, allowed only one-way communication.

NFC technology is usable only over a short distance of a few centimeters, which implies a voluntary user and prevents unintentional use.

NFC devices can be active or passive. A passive NFC device, such as a tag, a smart card or a simple chip affixed to an object contains information only readable by other NFC-enabled devices. A passive NFC device is powered by the electromagnetic field generated by a reader (active device) and therefore does not need its own power supply.

An active NFC device, however, is a device that generates an electromagnetic field. This generation can be done to communicate with a passive device (described above) or to establish a communication channel between two active devices.

The fact that a device like a smartphone has a power supply does not necessarily mean that it will work in active mode only. That is, a smartphone can handle the NFC interface in active or passive modes. In passive mode, the device emulates a chip card. In this mode, the smartphone (or any other portable device such as tablets) will store, in a secure memory, information that is normally stored in a card. Thus, when the smartphone detects an electromagnetic field, it can access the secure memory and a corresponding device having NFC capacities will be able to read information in passive mode from the secure memory.

The following are examples of known applications that use NFC technology:

- payment using a credit card or contactless (e.g., mobile phone, smartphone, laptop, tablet computer, etc.) mobile device on a contactless payment terminal;
- payment at a parking terminal accepting contactless payment using an NFC mobile terminal;
- contactless purchase of a ticket and contactless validation of a ticket displayed on a mobile phone;
- management of coupons, loyalty points, etc. in a store, at retailers, etc. (e.g., couponing);
- accessing and starting a vehicle using a mobile phone;
- reading product information (e.g., price, composition, allergy, etc.) in a store;
- controlling physical access to premises (e.g., meeting room, business, classroom, etc.);
- exchanging profiles between users of a social network or a game by bringing phones close together (e.g., user peer-to-peer communications);
- reading an electronic business card with a PDA (Personal Digital Assistant);
- synchronizing Internet bookmarks and contacts between a PDA and a mobile phone;
- recovering a key to a WiFi access point approaching an NFC device from an authorized terminal; and;
- accessing automation features of a building.

SUMMARY

Television sets or television receivers (e.g., set-top boxes) generally do not have an NFC interface. Currently, there is no interest in equipping these devices with NFC capabilities because the NFC communication range is short and it would be necessary to place television set/receiver very close to an NFC device to carry out a transaction. An object of the embodiments disclosed herein, therefore, is to provide a solution to this dilemma and allow the use of an NFC portable device (e.g., card or smartphone) during transactions using the television set.

Embodiments disclosed herein provide a remote control for controlling a television receiver, said remote control comprising a mechanism for communication with said receiver. The remote control further comprises an active NFC reader for communicating with an active or passive NFC device and a mechanism for transmitting information received from the NFC device to the receiver via the communication mechanism.

One feature the disclosed remote control is that it can communicate with an NFC device such as e.g., a payment card or a mobile phone having the NFC function. Thus, the user can carry out a purchase transaction, for example, through a display on his/her television set without having to get up from his/her favorite armchair to do so.

BRIEF DESCRIPTION OF THE DRAWINGS

Embodiments disclosed herein and their advantages will be better understood with reference to the enclosed drawings and to the following detailed description, in which.

DETAILED DESCRIPTION

Figure 1:
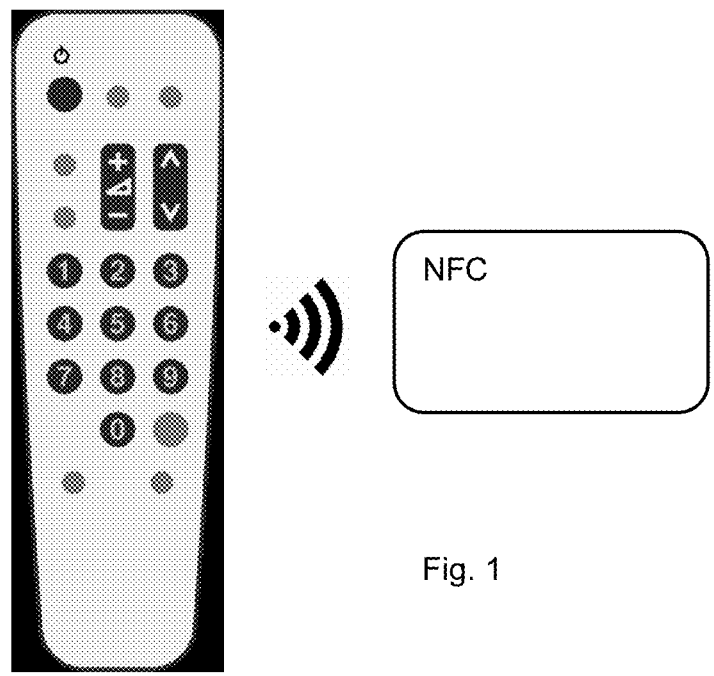
FIG. 1 shows a remote control communicating with a passive peripheral device in accordance with principles disclosed herein.

FIG. 1 shows an example situation in which a remote control acts as a reader of a passive device. A credit card with an NFC communication interface is illustrated, but it should be appreciated that any portable device can be used. According to an embodiment, an NFC component is integrated into an electronic wallet and used in this context. Another application is responsible for transferring access rights to the receiver. These rights are loaded on to the NFC device. Other example passive devices can be e.g., tags, books, tickets, etc.

Thus, according to disclosed principles, a movie or airplane ticket can be provided with a passive NFC component, and the embodiment disclosed herein will be able to access additional services of the movie theater/airline via a connected television receiver. For example, the remote control reads the code from the airplane ticket and sends it to the receiver. This code contains at least one address and identification information. The receiver may e.g., transmit the identification information to an address contained in the code, this identification information allows the identification of the details of the ticket. The user can thus e.g., access his/her mileage account, take part in a competition or state his/her opinion on the service to earn additional miles, etc.

Figure 2:
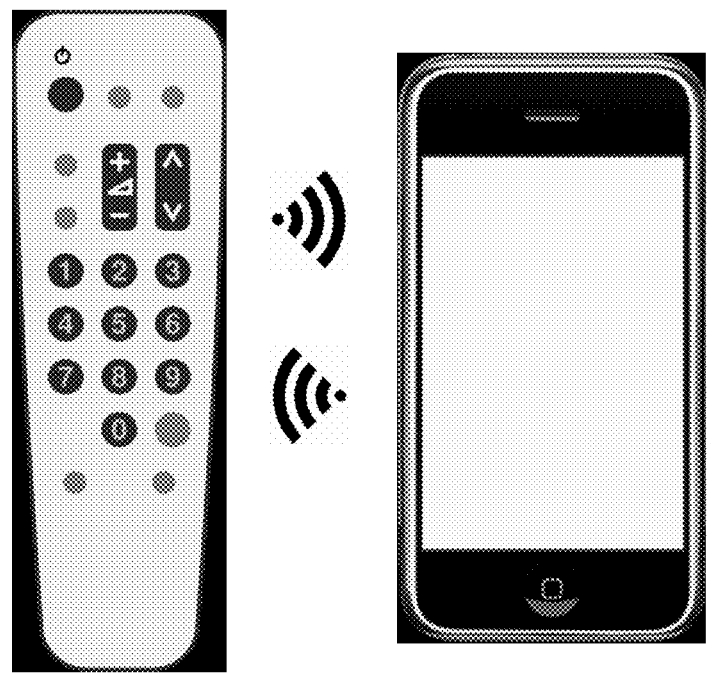
FIG. 2 shows a remote control communicating with an active peripheral device in accordance with principles disclosed herein.

FIG. 2 shows an example situation in which the remote control communicates with another active device. Each device creates an electromagnetic field that enables a data exchange at a higher speed and at a longer communication distance.

As discussed above, it should be noted that even though the NFC device has its own energy source it does not mean that the device must operates in the active mode. For example, a smartphone can operate in the passive mode when used with the remote control.

In order to limit power consumption, a button for activating the NFC function is provided on the remote control. By pressing the button, the electromagnetic field emitter is activated and a response from an NFC device is expected. Once the NFC device is detected, the code is read by the remote control and the emitter is disabled. If no device is detected during a predefined time, the emitter will be disabled.

Once the code is received by the remote control, it is transmitted to the receiver according to several possible methods.

According to a first embodiment, the code is simply transmitted via the infrared emitter. A message comprising a header and the code is composed. A marking information is added to inform the receiver, upon reception of the message, that it has to re-route the received code to the application that is waiting for the arrival of the identification information (also referred to herein as information data). According to a particular embodiment, the information data received by the NFC device is encrypted by a key. This key is loaded into the receiver and into the remote control during initialization. The encrypted information data will then be transmitted to the receiver via the infrared channel. The receiver will use the same key to decrypt the information data.

According to a second embodiment, a bidirectional channel is created between the receiver and the remote control. Preferably, a radio emitter/receiver will be used for the remote control such as, for example, a Bluetooth emitter/receiver. The information data can also be encrypted according to the above described technique. Alternatively, it is possible to generate a session key by using a protocol such as Diffie-Hellmann for encrypting the information data.

The receiver then decrypts the information data and transmits it to the application that can use this data.

As mentioned above, this application can be an on-line trading site, a secured voting platform (i.e., one single person can vote, as identified by the code of the portable device), or a generic application that will react to an address contained in the code and connect the receiver to the identified distant application.

In the voting example, a voting application can be loaded into the smartphone and be identified by the voting site in a particular way, which means that the user has registered with this site and has received such an identifier.

During a program allowing television viewers to cast a vote, the viewers will be prompted to use a smartphone to cast a vote and thus, identifier will be transmitted to the remote control and to the receiver. As the receiver is connected to the Internet, it can transmit the voter's identifier along with an identifier of the current program.

Another application is used for the other side of the transaction (i.e., in the opposite direction of e.g., the vote). During the vote, the receiver extracts, from the metadata of the program, a code identifying the current program. This code is unique for each program and not predictable (for example, a random number). This code is transmitted to the remote control via the bidirectional channel and to the smartphone via the NFC communication. The vote application loaded in the smartphone can then add the user's identifier, the result of the user's choice and send a message to the voting site containing the identifier of the program, the user's identifier, and the choice. This prevents someone who has not followed the program from voting and also prevents third parties from voting without having initially registered.

According to one embodiment the receiver includes an NFC reader that contains the parameters enabling the remote control to communicate with the receiver. In fact, an in particular with radio frequency remote controls, a programming step is necessary to pair the remote control with the receiver. A setup parameter is transferred from the receiver to the remote control due to the NFC connection. This parameter will serve to identify the remote control while sending commands via a radio frequency channel and will thus allow the receiver to filter the instructions that are addressed to it. This parameter can be the frequency or frequencies to be used, or an identification code placed in the header of the transmitted data.

An alternative to this embodiment loads the setup parameters into a passive NFC device provided with the receiver. It is sufficient to use this NFC card to set the remote control and thus, enable communications with the receiver. This mechanism prevents one device from interfering with another one.

The devices to be paired, for example, the receiver and the remote control, are placed next to each other. When the devices detect each other, pairing may be initiated, i.e., the receiver detects the remote control and determines if an identifier of the remote control is already stored in a setup memory of the receiver or not. If not, a message may be displayed to the user to initiate the pairing by pressing e.g., an "OK" button or "exit" button if pairing is not desired. When the user approves the pairing, a pairing request message containing an identifier of the remote control is sent to the receiver, which returns an acknowledgement message containing parameters of the receiver that are necessary for pairing.

The pairing data of the receiver and remote control are stored in both devices so that the receiver recognizes the remote control to which it is paired to when communicating via the radio frequency channel.

The pairing may further comprise, in addition to identifiers, a cryptographic key or pairing key that is exchanged by the devices. The pairing key is then used to encrypt data transmitted by the remote control and the receiver. The devices can further be authenticated with a key pertaining to the user or to a home network.

The pairing can be permanent, but, according to a desired embodiment, the pairing is temporary. This means that, for example, a remote control paired with a specific television set can be paired with another television set, simply by placing the remote control next to another television set within the range of an NFC data transmission. In this case, the former pairing data (e.g., identifier, key, parameters) are deleted and replaced by new pairing data. This embodiment thus provides a very flexible pairing process.

According to a further embodiment, a remote control may be paired with several devices in a multi-pairing mode. In this case, when a device is placed next to another device in order to be paired, the former pairing data is not erased; instead, the prior pairing data is kept. This embodiment may be used e.g., for forming a home network.

The pairing could be applied to a remote control and television set as mentioned above, but may also be applied to any similar device having NFC capabilities (e.g., set-top-boxes, Hi-Fi installations, doors or gates, heating or air conditioner, or any device that can be controlled by a remote control). A remote control may be e.g., a smartphone, tablet, personal digital assistant, or any similar portable device. The same pairing principle could also be applied to a wireless mouse or keyboard paired with a personal computer or a tablet.

The invention claimed is:

1. A remote control for controlling a receiver, said remote control comprising:
   a transmitter for communicating with said receiver, said transmitter requiring a setting to enable communications with the receiver;
   wherein the setting defines a frequency or frequencies to be used, or an identification code placed in the header of the transmitted data in order to communicate with the receiver;
   an active near field communication (NFC) reader for communicating with an active or passive NFC device;
   and a logic circuit configured to transmit information received from said NFC device to the receiver via the transmitter;
   wherein the transmitter uses a setting received from the NFC device via the reader to communicate with the receiver.

2. The remote control of claim 1, wherein the transmitter is configured to communicate with the receiver via an infrared channel.

3. The remote control of claim 2, further comprising a memory for storing a key, and wherein the remote control is configured to encrypt data sent via the infrared channel.

4. The remote control of claim 1, wherein the transmitter is a transceiver.

5. The remote control of claim 4, further comprising a memory for storing a key, and wherein the remote control is configured to encrypt data sent via the transceiver.

6. The remote control of claim 4, wherein the remote control is configured to generate a session key with a receiver and encrypt the data sent with the session key via the transceiver.

7. The remote control of claim 1, further comprising a button for activating NFC communications, wherein an NFC active mode is activated when the button is pressed.

8. The remote control of claim 7, further comprising a timer, said timer comprising a value that is initialized when the button is pressed, the remote control being configured to compare the value of the timer with a predefined value and deactivate the active NFC mode when the value has reached the predefined value.

9. A method for controlling a receiver from a remote control, said method comprising:
   receiving, by the remote control, information and a setting from an active or passive NFC device;
   wherein the setting defines a frequency or frequencies to be used, or an identification code placed in the header of the transmitted data in order to communicate with the receiver;
   and transmitting, from the remote control using the setting, information received from said NFC device to the receiver via a transmitter;
   wherein said transmitter requires the setting to enable communications with the receiver.

10. The method of claim 9, wherein the transmitter is configured for communication via an infrared channel.

11. The method of claim 10, further comprising using a key to encrypt data sent via the infrared channel.

12. The method of claim 9, wherein the transmitter is a transceiver and the method further comprises using a key to encrypt data sent via the transceiver.

13. The method of claim 9, wherein the transmitter is a transceiver and the method further comprises generating a session key with a receiver and encrypting data sent with the session key via the transceiver.

14. The method of claim 9, wherein the remote control comprises a button for activating NFC communications, and the method further comprises activating an NFC active mode in response to the button being pressed.

15. The method of claim 14, wherein the remote control further comprises a timer, the timer comprising a value that is initialized when the button is pressed, and wherein the method further comprises comparing the value of the timer with a predefined value and deactivating the active NFC mode when the value has reached the predefined value.

* * * * *